United States Patent [19]
Kern et al.

[11] Patent Number: 5,870,537
[45] Date of Patent: *Feb. 9, 1999

[54] CONCURRENT SWITCH TO SHADOWED DEVICE FOR STORAGE CONTROLLER AND DEVICE ERRORS

[75] Inventors: Robert Frederic Kern, Tucson, Ariz.; Michael Aloysius Paulsen, Morgan Hill, Calif.; William Chambers Shepard, Hyde Park; Harry Morris Yudenfriend, Poughkeepsie, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 614,588

[22] Filed: Mar. 13, 1996

[51] Int. Cl.$^6$ .................................................. G06F 11/00
[52] U.S. Cl. ........................................ 395/182.04; 711/162
[58] Field of Search ........................ 395/182.03, 182.04, 395/182.05, 182.06, 182.07, 182.09, 182.1, 182.11; 211/162; 707/202, 204

[56] References Cited

U.S. PATENT DOCUMENTS

| | | | |
|---|---|---|---|
| 4,608,688 | 8/1986 | Hansen et al. | 371/11 |
| 5,212,784 | 5/1993 | Sparks | 395/575 |
| 5,235,700 | 8/1993 | Alaiwan et al. | 395/575 |
| 5,278,969 | 1/1994 | Pashan et al. | 395/425 |
| 5,303,243 | 4/1994 | Anezaki | 371/9.1 |
| 5,504,861 | 4/1996 | Crokett et al. | 395/182.11 |
| 5,544,347 | 8/1996 | Yanai et al. | 395/489 |
| 5,615,329 | 3/1997 | Kern et al. | 395/182.04 |
| 5,692,155 | 11/1997 | Iskiyan et al. | 395/182.04 |
| 5,742,792 | 4/1998 | Yanai et al. | 395/182.04 |

Primary Examiner—Joseph Palys
Attorney, Agent, or Firm—Robert M. Sullivan

[57] ABSTRACT

A disaster recovery system providing remote data shadowing between a primary and a secondary site uses a method and apparatus for swapping, or switching, host directed I/O operations from a primary data storage device to a secondary data storage device in a remote copy duplex pair. Application programs running in a host processor at the primary site first quiesce all I/O operations and record updates targeted to the primary data storage device. The remote copy duplex pair is checked to verify that the secondary data storage device is a fully synchronized copy of the primary data storage device. The secondary data storage device is then swapped with the primary data storage device by terminating the remote copy duplex pair, establishing an opposite direction remote copy duplex pair such that the secondary data storage device is a primary device of the duplex pair and the primary data storage device is a shadowing device, and updating the application programs running in the primary host processor with a device address of the secondary data storage device substituted as a device address of the primary data storage device. Finally, the primary host processor resumes its application programs such that subsequent I/O operations and record updates targeted for the primary data storage device are directed through a secondary storage controller to the secondary data storage device, and copied to the primary data storage device.

20 Claims, 7 Drawing Sheets

CONCURRENT SWITCH TO SHADOWED DEVICE FOR STORAGE CONTROLLER AND DEVICE ERRORS

FIELD OF THE INVENTION

The present invention relates generally to disaster recovery in data processing systems, and more particularly, to a method and apparatus for switching to a shadowed device for all subsequent I/O operations at the primary site when an error occurs on either a primary device or a primary storage controller. Applications running in the primary host are notified that subsequent I/O operations must be directed to the secondary device.

BACKGROUND OF THE INVENTION

Data processing systems typically require a large amount of data storage. Effective data processing systems efficiently access, modify, and re-store data within the data storage. Data storage is typically separated into several different levels depending on the time to access the data or the cost to store the data. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nanoseconds. The electronic memory provides the fastest access to data since access is entirely electronic.

A second level of data storage usually involves direct access storage devices (DASD). DASD storage, for example, can comprise magnetic and/or optical disks. Data bits are stored as micrometer sized magnetically or optically altered spots on a disk surface which represent the "ones" and "zeros" that comprise the binary value of the data bits. Magnetic DASD includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store gigabytes of data with the access to such data typically measured in milliseconds (orders of magnitudes slower than electronic memory). Access to data stored on DASD is slower due to the need to physically position the disk and HDA to the desired data storage location.

A third or lower level of data storage includes tapes, tape libraries, and optical disk libraries. Access to data is much slower in a library since a robot is necessary to select and load the needed data storage medium. An advantage of these storage systems is the reduced cost for very large data storage capabilities, on the order of terabytes of data. Tape storage is often used for back-up purposes. That is, data stored at the second level of the data storage hierarchy is reproduced for safe keeping on magnetic tape. Access to data stored on tape and/or in a library is presently on the order of seconds.

Having a back-up data copy is mandatory for many businesses as data loss could be catastrophic to the business. The time required to recover data lost at the primary storage level is also an important recovery consideration. An improvement in speed over tape or library back-up, includes dual copy. An example of dual copy involves providing additional DASD's so that data is written to the additional DASDs (sometimes referred to as mirroring). Then if the primary DASDs fail, the secondary DASDs can be depended upon for data. A drawback to this approach is that the number of required DASDs is doubled.

Another data back-up alternative that overcomes the need to provide double the storage devices involves writing data to a redundant array of inexpensive devices (RAID). In this configuration, the data is written such that the data is apportioned amongst many DASDs. If a single DASD fails, then the lost data can be recovered by using the remaining data and error correction procedures. Currently there are several different RAID configurations available.

The aforementioned back-up solutions are generally sufficient to recover data in the event that a storage device or medium fails. These back-up methods are useful only for device failures since the secondary data is a mirror of the primary data, that is, the secondary data has the same volume serial numbers (VOLSERs) and DASD addresses as the primary data. Data recovery due to system failures or storage controller failures, on the other hand, is not available using mirrored secondary data. Hence still further protection is required for recovering data if a disaster occurs destroying the entire system or even the site, for example, earthquakes, fires, explosions, hurricanes, etc. Disaster recovery requires that the secondary copy of data be stored at a location remote from the primary data. A known method of providing disaster protection is to periodically back-up data to tape, such as a daily or weekly basis. The tape is then picked up by a vehicle and taken to a secure storage area usually located kilometers from the primary data location. This back-up plan has problems: it could take days to retrieve the back-up data, additional data is lost waiting for the back-up data to be recovered, or the same disaster could also destroy the storage location. A slightly improved back-up method would transmit data to a back-up location each night. This allows the data to be stored at a more remote location. Again, some data may be lost between back-ups since back-up does not occur continuously, as in the dual copy solution. Hence, a substantial amount of data could still be lost and this may be unacceptable to some users.

More recently introduced data disaster recovery solutions include remote dual copy wherein data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The distance separating the primary and secondary locations depends upon the level of risk acceptable to the user, and can vary from several kilometers to thousands of kilometers. The secondary or remote location, in addition to providing a back-up data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

The secondary site must not only be sufficiently remote from the primary site, but must also be able to back-up primary data in real time. The secondary site needs to back-up primary data as the primary data is updated with some minimal delay. Additionally, the secondary site has to back-up the primary data regardless of the application program (e.g., IMS, DB2) running at the primary site and generating the data and/or updates. A difficult task required of the secondary site is that the secondary data must be order consistent, that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation (providing a channel end (CE) and device end (DE) to the primary host). Synchronous copy, therefore, slows the primary DASD I/O response time while waiting for secondary confirmation. Primary I/O response delay is increased proportionately with the distance between the primary and secondary systems—a factor that limits the remote distance to tens of kilometers. Synchronous copy, however, provides sequentially consistent data at the secondary site with relatively little system overhead.

Synchronous remote copy for disaster recovery also requires that paired DASD volumes form a set. The DASD volumes at the secondary site essentially form a "duplex pair" with the corresponding DASD volumes at the primary site. Forming such a set further requires that a sufficient amount of system information be provided to the secondary site for identifying those DASD volumes (VOLSERs) which pair with DASD volumes at the primary site. The secondary site must also recognize when a DASD volume is "failed duplex", when a DASD at the secondary site is no longer synchronized with its primary site counterpart. The primary site can suspend remote copy to allow the primary site to continue transferring data updates while these updates are queued for the secondary site. The primary site marks these updates to show the secondary site is no longer synchronized.

Synchronous remote copy disaster recovery systems have the desired ability to suspend the remote copy pair and queue the updates to be subsequently transferred to the secondary site because of their synchronous design. The host application at the primary site cannot start the next I/O transfer to the primary storage controller until the previous I/O transfer has been synchronized at the secondary site. If the previous I/O was not successfully transmitted to the secondary site, the remote copy pair is suspended before the subsequent I/O transfer is started. Thus, the subsequent I/O transfers to this remote copy pair can be queued for later transmittal to the secondary site once the remote copy pair is re-established.

Asynchronous remote copy provides better primary application system performance because the primary DASD I/O operation is completed (providing a channel end (CE) and device end (DE) to the primary host) before data is confirmed at the secondary site. Therefore, the primary DASD I/O response time is not dependent upon the distance to the secondary site and the secondary site could be thousands of kilometers remote from the primary site. A greater amount of system overhead is required, however, for ensuring data sequence consistency since data received at the secondary site will often not be in order of the primary updates. A failure at the primary site could result in some data being lost that was in transit between the primary and secondary locations.

Further, certain errors in the data processing system at the primary site, either in the host application or in the storage subsystem, can cause the termination of the remote copy function. Unlike synchronous remote copy designs, current asynchronous remote copy systems typically cannot suspend the remote copy duplex pair. Once remote copy has been terminated, resumption of the remote copy function requires all data from the primary DASDs to be copied to the secondary DASDs to ensure re-synchronization of the two sites.

While remote data duplexing provides sufficient solutions for disaster recovery, remote data duplexing does not provide an efficient means for recovery when the storage controller at the primary site becomes inaccessible. Two common reasons for the primary storage controller becoming inaccessible are an error occurs in the storage controller or the storage controller is temporarily disabled for planned maintenance. In either a dual copy or remote data duplexing environment, either planned maintenance or an error in the storage controller causes the applications running in the attached host processors to terminate their I/O to all data storage devices connected to the storage controller. In addition, all duplex pairs associated with the primary data storage devices connected to the primary storage controller are failed and reported to the associated host processor applications as failed duplex. Thus, when the storage controller has recovered from its error or planned maintenance, all primary data storage devices must be re-synchronized with their corresponding shadowed data storage devices at the secondary site before the data processing system may continue as a synchronized disaster recovery system across the two sites.

Accordingly, a method in a remote data duplexing system is needed to provide access to data stored on a primary storage device from an application running in the primary host processor when an error occurs at the primary storage controller. In addition, such method may also provide more direct access to data on a failed primary storage device for an application running in the primary host processor.

SUMMARY OF THE INVENTION

An object of the present invention is to provide a method and apparatus for securing continuous data availability in a remote data duplexing system by switching, or swapping, host directed I/O operations from a primary data storage device to a secondary data storage device when a failure occurs on a primary storage controller.

Another object of the present invention is to provide an improved method and apparatus for securing continuous data availability in a remote data duplexing system by switching, or swapping, host directed I/O operations from a primary data storage device to a secondary data storage device when a failure occurs on the primary data storage device.

A first embodiment of the present invention provides a method for switching, or swapping, host directed I/O operations from a primary data storage device to a secondary data storage device when a subsystem failure occurs within a remote copy disaster recovery system. The method first quiesces all I/O operations and record updates targeted to a primary data storage device from application programs running in a primary host processor located at a primary site. Also, the method verifies that the primary and secondary data storage devices form a remote copy duplex pair in full duplex mode insuring data integrity in that the secondary data storage is an exact replica of the primary data storage device. Next, the secondary data storage device is swapped with the primary data storage device by terminating the remote copy duplex pair, establishing an opposite direction remote copy duplex pair such that the secondary data storage device is a primary device of the remote copy duplex pair and the primary data storage device is a shadowing device, and updating the application programs running in the primary host processor with a device address of the secondary data storage device substituted as a device address of the primary data storage device. Finally, the method in the present invention resumes all I/O operations and record updates from the application programs running in the primary host processor such that all subsequent I/O operations and record updates targeted for the primary data storage device are directed through a secondary storage controller to the secondary data storage device.

Another embodiment of the present invention provides a disaster recovery system for carrying out the method described in the first embodiment. The disaster recovery system includes a primary site and a secondary site. The primary site includes a host processor running one or more applications generating I/O operations and record updates, a primary data storage device of a remote copy pair, and a storage controller coupled between the host processor and the primary data storage device. The secondary site includes a host processor, a secondary data storage device of a remote copy pair, and a storage controller coupled between the host processor and the secondary data storage device. The storage controller at the secondary site is further coupled to the host processor at the primary site.

The primary site further includes a device swapping means for switching host directed I/O operations from the primary data storage device to the secondary data storage device when a failure occurs within the primary subsystem. The device swapping means comprises a quiescing means for suspending all I/O operations and record updates from the primary host processor applications to the primary data storage device, and a validation means for verifying that the primary data storage device and the secondary data storage device form a valid remote copy pair. The device swapping means further includes terminating means for breaking the remote copy duplex pair, and an establishing means for forming an opposite direction remote copy pair with the secondary data storage device as the primary device of the duplex pair and the primary data storage device as the shadowing device of the duplex pair. Finally, the device swapping means also includes an updating means for substituting the secondary data storage device address for the primary data storage device address in the control blocks of the primary host processor applications, and a resuming means for continuing all subsequent I/O operations and record updates from the primary host processor directly to the secondary data storage device through the storage controller at the secondary site.

In yet another embodiment of the present invention, a storage controller in a disaster recovery system is provided for swapping, or switching, a secondary data storage device of a remote copy duplex pair with a primary data storage device of the same duplex pair which has failed due to a permanent error. The disaster recovery system includes a primary site and a secondary site. The primary site includes a host processor running one or more applications generating I/O operations and record updates, a primary data storage device of a remote copy pair, and the aforementioned storage controller coupled between the host processor and the primary data storage device. The secondary site includes a host processor, a secondary data storage device of a remote copy pair, and a storage controller coupled between the host processor and the secondary data storage device. The primary storage controller is furthered coupled to the secondary storage controller through several fiber optic communication and data links.

The primary storage controller further includes a device swapping means for switching host directed I/O operations from the primary data storage device to the secondary data storage device when a permanent error occurs on the primary data storage device. The device swapping means further comprises a validation means for verifying that the primary data storage device and the secondary data storage device form a valid remote copy pair, a terminating means for breaking the remote copy duplex pair, and an establishing means for forming an opposite direction remote copy pair with the secondary data storage device as the primary device of the duplex pair and the primary data storage device as the shadowing device of the duplex pair. Additionally, the primary storage controller communicates with the primary host processor to quiesce all I/O operations and record updates from the primary host processor applications to the primary data storage device before the device swap is performed. The primary storage controller further prompts the primary host processor to update the secondary data storage device address for the primary data storage device address in the control blocks of the applications and to resume all subsequent I/O operations and record updates from the primary host processor directly to the secondary data storage device through the storage controller at the secondary site.

The foregoing and other objects, features, and advantages of the invention will be apparent from the following more particular description of a preferred embodiment of the invention, as illustrated in the accompanying drawings.

DETAILED DESCRIPTION OF THE INVENTION

Figure 1:
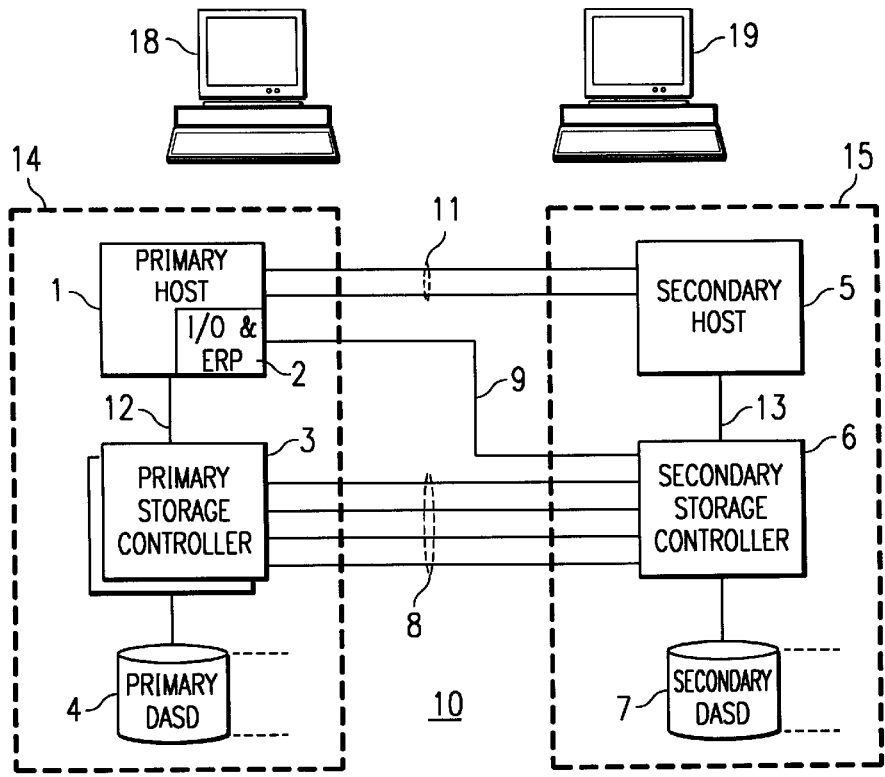
FIG. 1 is a block diagram of a disaster recovery system having synchronous remote copy capabilities.

Referring more particularly to the drawing, like numerals denote like features and structural elements in the various figures. The invention will be described as embodied in a data processing system incorporating remote data duplexing for disaster recovery. Turning now to FIG. 1, a disaster recovery system 10 is shown having a primary site 14 and a secondary site 15, wherein the secondary site 15 is located, for example, 20 kilometers remote from the primary site 14. The primary site 14 includes a host processor or primary processor 1 having an application and system I/O and Error Recovery Program 2 running therein (hereinafter referred to as I/O ERP 2). The primary processor 1 could be, for example, an IBM Enterprise Systems/9000 (ES/9000) processor running DFSMS/MVS operating software and further may have several application programs running thereon. A primary storage controller 3, for example, an IBM 3990 Model 6 storage controller, is connected to the primary processor 1 via a channel 12. As is known in the art, several such primary storage controllers 3 can be connected to the primary processor 1, or alternately, several primary processors 1 can be attached to the primary storage controllers 3. A primary DASD 4, for example, an IBM 3390 or RAMAC DASD, is connected to the primary storage controller 3. Several primary DASDs 4 can be connected to the primary storage controller 3. The primary storage controller 3 and attached primary DASD 4 form a primary storage subsystem. Further, the primary storage controller 3 and the primary DASD 4 could be single integral units.

The secondary site 15 includes a secondary processor 5, for example, an IBM ES/9000, connected to a secondary storage controller 6, for example an IBM 3990 Model 6, via a channel 13. A DASD 7 is further connected to the secondary storage controller 6. The primary processor 1 is connected to the secondary processor 5 by at least one host-to-host communication link 11, for example, channel links or telephone T1/T3 line links, etc. The primary processor 1 may also have direct connectivity with the secondary storage controller 6 by, for example, multiple Enterprise Systems Connection (ESCON) links 9. As a result, the I/O ERP 2 can communicate, if required, with the secondary storage controller 6. The primary storage controller 3 communicates with the secondary storage controller 6 via multiple peer-to-peer links 8, for example, multiple ESCON links.

When a write I/O operation is executed by an application program running in the primary processor 1, a hardware status channel end/device end (CE/DE) is provided indicating the I/O operation completed successfully. Primary processor 1 operating system software marks the application write I/O successful upon successful completion of the I/O operation, thus permitting the application program to continue to a next write I/O operation which may be dependent upon the first or previous write I/O operation having successfully completed. On the other hand, if the write I/O operation was unsuccessful, the I/O status of channel end/device end/unit check (hereinafter referred to as CE/DE/UC) is presented to the primary processor 1 operating system software. Having presented unit check, the I/O ERP 2 takes control obtaining specific sense information from the primary storage controller 3 regarding the nature of the failed write I/O operation. If a unique error to a volume occurs then a unique status related to that error is provided to the I/O ERP 2. The I/O ERP 2 can thereafter perform new peer-to-peer synchronization error recovery for maintaining data integrity between the primary storage controller 3 and the secondary storage controller 6, or in the worst case, between the primary processor 1 and the secondary processor 5.

Consequently, the disaster recovery system 10 described in FIG. 1 accomplishes outboard synchronous remote copy such that a primary host process error recovery procedure having an I/O order, or channel command word (CCW), may change a status of a primary and secondary synchronous remote copy volume from duplex pair to failed duplex, thereby maintaining data integrity for several types of primary and secondary subsystem errors. This disaster recovery system 10 provides storage based back-up, rather than application based back-up, wherein data updates are duplicated in real time. In addition, the host processor 1, 5 within the disaster recovery system 10 can maintain the status of the remote copy duplex pair 4, 7. The applications running within the host processor 1, 5 can establish, suspend, or terminate the remote copy duplex pair 4, 7. The host processor 1, 5 sends control commands over the communication links, 12, 13 to the storage controller 3, 6 according to the action to be taken regarding the duplex pair 4, 7. The applications then update channel and device control blocks within the subsystem to reflect the current status of the remote copy duplex pair 4, 7.

Figure 2:
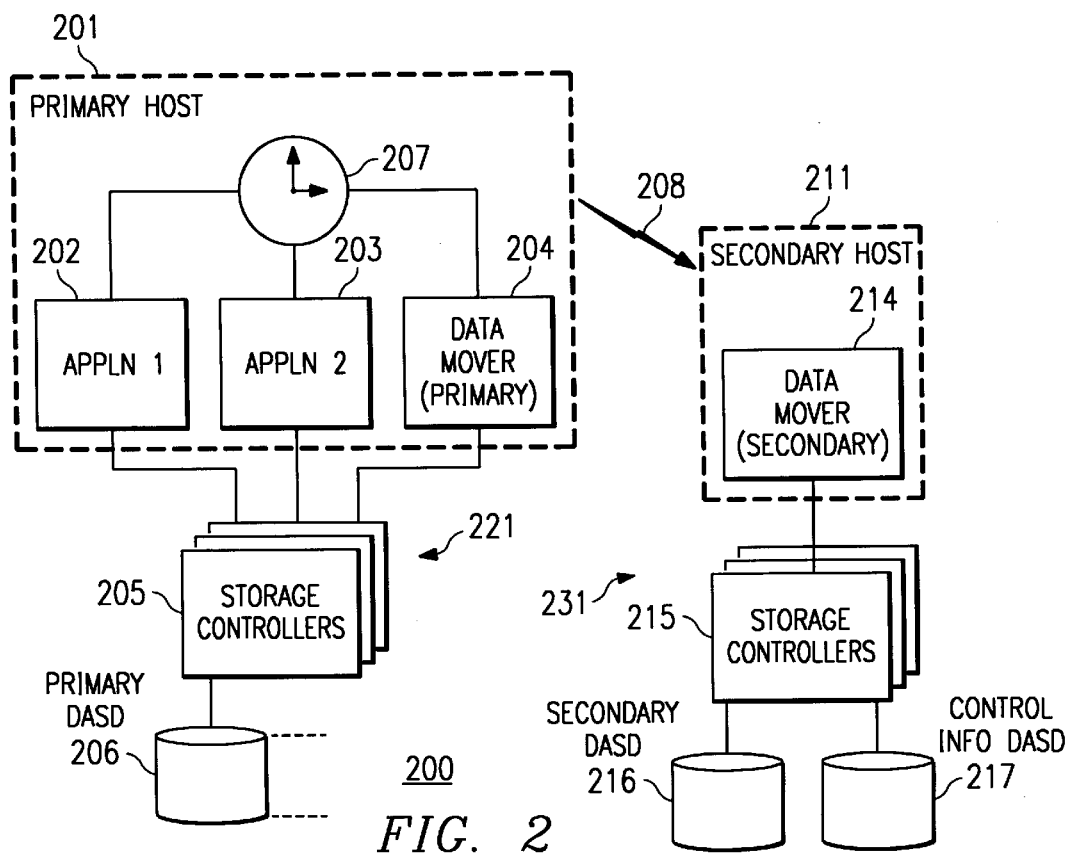
FIG. 2 is a block diagram of a disaster recovery system having asynchronous remote copy capabilities.

Referring now to FIG. 2, this figure depicts an asynchronous disaster recovery system 200 including a primary site 221 and a remote or secondary site 231. The primary site 221 includes a primary processor 201, for example, an IBM ES/9000 running DFSMS/MVS host software. The primary processor 201 further includes application programs 202 and 203, for example, IMS and DB2 applications, and a primary data mover (PDM) 204. A common sysplex clock 207 is included in the primary processor 201 for providing a common reference to all applications (202, 203) running therein, wherein all system clocks or time sources (not shown) synchronize to the sysplex clock 207 ensuring all time dependent processes are properly timed relative to one another. The primary storage controllers 205, for example, synchronize to a resolution appropriate to ensure differentiation between record write update times, such that no two consecutive write I/O operations to a single primary storage controller 205 can exhibit the same time stamp value. The resolution, and not the accuracy, of the sysplex timer 207 is critical. The PDM 204, though shown connected to the sysplex timer 207, is not required to synchronize to the sysplex timer 207 since write I/O operations are not generated therein. A sysplex timer 207 is not required if the primary processor 201 has a single time reference (for example, a single multi-processor ES/9000 system).

A plurality of primary storage controllers 205, for example, IBM 3990 Model 6 storage controllers, are connected to the primary processor 201 via a plurality of channels, for example, fiber optic channels. Connected to each primary storage controller 205 is at least one string of primary DASDs 206, for example, IBM 3390 or RAMAC DASDs. The primary storage controllers 205 and the primary DASDs 206 form a primary storage subsystem. Each storage controller 205 and primary DASD 206 need not be separate units, but may be combined into a single drawer.

The secondary site 231, located for example, some thousands of kilometers remote from the primary site 221, similar to the primary site 221, includes a secondary processor 211 having a secondary data mover (SDM) 214 operating therein. Alternatively, the primary and secondary sites can be the same location, and further, the primary and secondary data movers can reside on a single host processor (secondary DASDs may be just over a fire-wall). A plurality of secondary storage controllers 215 are connected to the secondary processor 211 via channels, for example, fiber optic channels, as is known in the art. Connected to the storage controllers 215 are a plurality of secondary DASDs 216 and a control information DASD(s) 217. The storage controllers 215 and DASDs 216 and 217 comprise a secondary storage subsystem.

The primary site 221 communicates with the secondary site 231 via a communication link 208. More specifically, the primary processor 201 transfers data and control information to the secondary processor 211 by a communications protocol, for example, a virtual telecommunications access method (VTAM) communication link 208. The communication link 208 can be realized by several suitable communication methods, including telephone (T1, T3 lines), radio, radio/telephone, microwave, satellite, etc.

The asynchronous data shadowing system 200 encompasses collecting control data from the primary storage controllers 205 so that an order of all data writes to the primary DASDs 206 is preserved and applied to the secondary DASDs 216 (preserving the data write order across all primary storage subsystems). The data and control information transmitted to the secondary site 231, must be sufficient such that the presence of the primary site 221 is no longer required to preserve data integrity.

The applications 202, 203 generate data or record updates, which record updates are collected by the primary storage controllers 205 and read by the PDM 204. The primary storage controllers 205 each grouped its respective record updates for an asynchronous remote data shadowing session and provides those record updates to the PDM 204 via non-specific primary DASD 206 READ requests. Transferring record updates from the primary storage controllers 205 to the PDM 204 is controlled and optimized by the PDM 204 for minimizing a number of START I/O operations and time delay between each read, yet maximizing an amount of data transferred between each primary storage controller 205 and the primary processor 201. The PDM 204 can vary a time interval between non-specific READs to control this primary storage controller-host optimization as well as a currency of the record updates for the secondary DASDs 216.

Collecting record updates by the PDM 204, and transmitting those record updates to the SDM 214, while maintaining data integrity, requires the record updates to be transmitted for specific time intervals and in appropriate multiple time intervals with enough control data to reconstruct the primary DASDs 206 record WRITE sequence across all primary storage subsystems to the secondary DASDs 216. Reconstructing the primary DASDs 206 record WRITE sequences is accomplished by passing self-describing records from the PDM 204 to the SDM 214. The SDM 214 inspects the self-describing records for determining whether any records for a given time interval have been lost or are incomplete.

Figure 3:
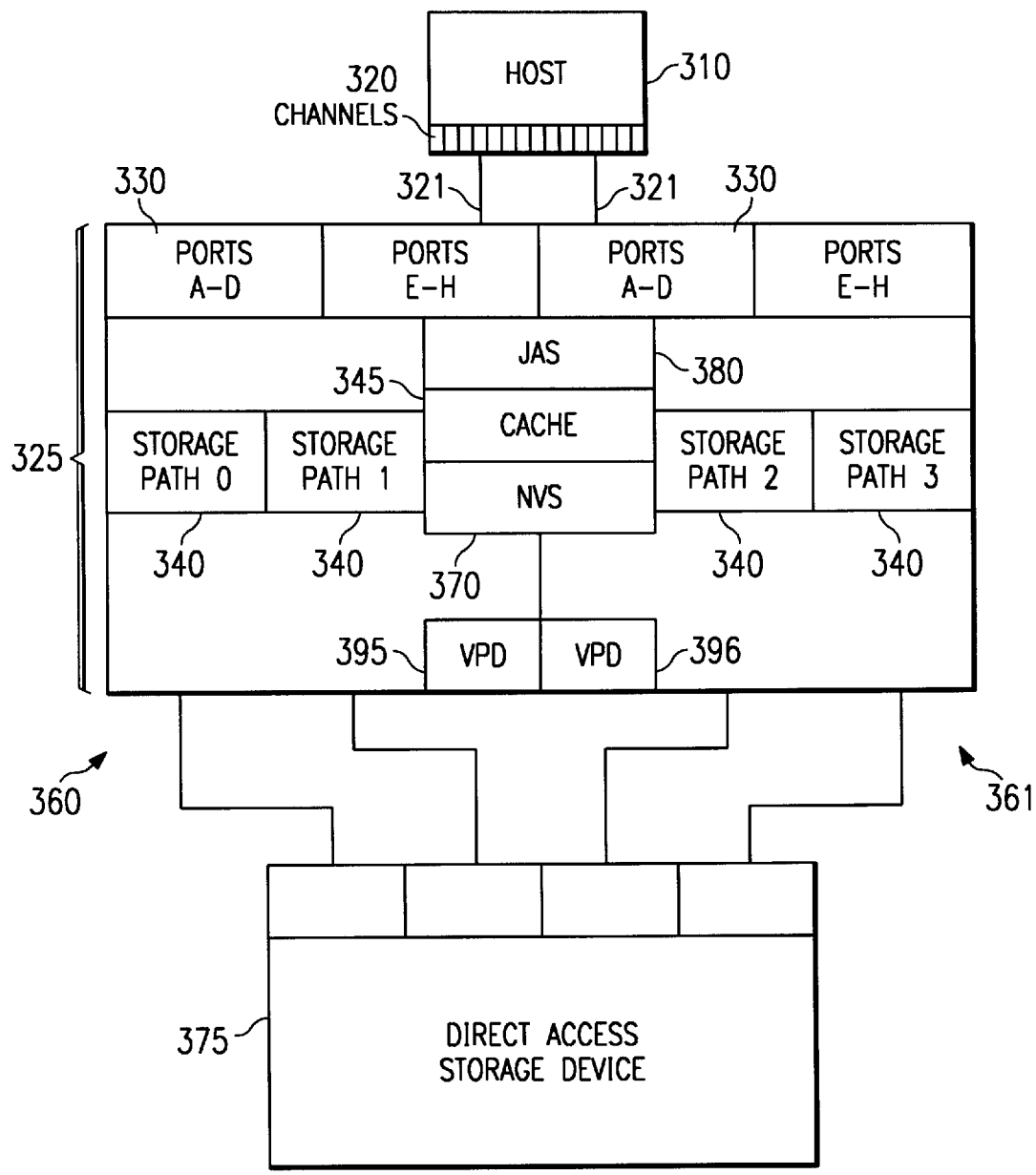
FIG. 3 is a block diagram showing a storage controller in greater detail as connected in data storage system.

Referring to FIG. 3, a storage controller 325, for example an IBM 3990 storage controller, is shown in greater detail as connected to a data processing system including a host processor 310, such as an IBM System/370 or IBM Enterprise Systems/9000 (ES/9000) processor running, for example, data facility storage management subsystem/multiple virtual systems (DFSMS/MVS) software. The storage controller 325 is further connected to a direct access storage device (DASD) 375, such as an IBM 3390 or RAMAC DASD. A storage subsystem is formed by the storage controller 325 and DASD 375. The storage subsystem is connected to the host processor 310 via communication links 321, wherein the communication links 321 connect to channels 320 of the host processor 310 and to ports A–D, E–H 330 of the storage controller 325. The communication links 321 can be either parallel or serial links, for example, enterprise system connections (ESCON) serial fiber optic links.

The storage controller 325 includes dual clusters 360 and 361, the dual clusters 360, 361 having separate power supplies (not shown) and further including ports A–D, E–H 330 for providing a communication interface thereto. Both non-volatile storage (NVS) 370 and cache 345 are provided for temporary data storage and are accessible to both clusters 360, 361. Storage paths 0–3 340 provide necessary paths to the DASD 375. Vital product data is maintained in VPDs 395 and 396. A storage controller, similar to the storage controller 325 is described in U.S. Pat. No. 5,051,887, assigned to the assignee of the present invention, and is hereby incorporated by reference.

Figure 4:
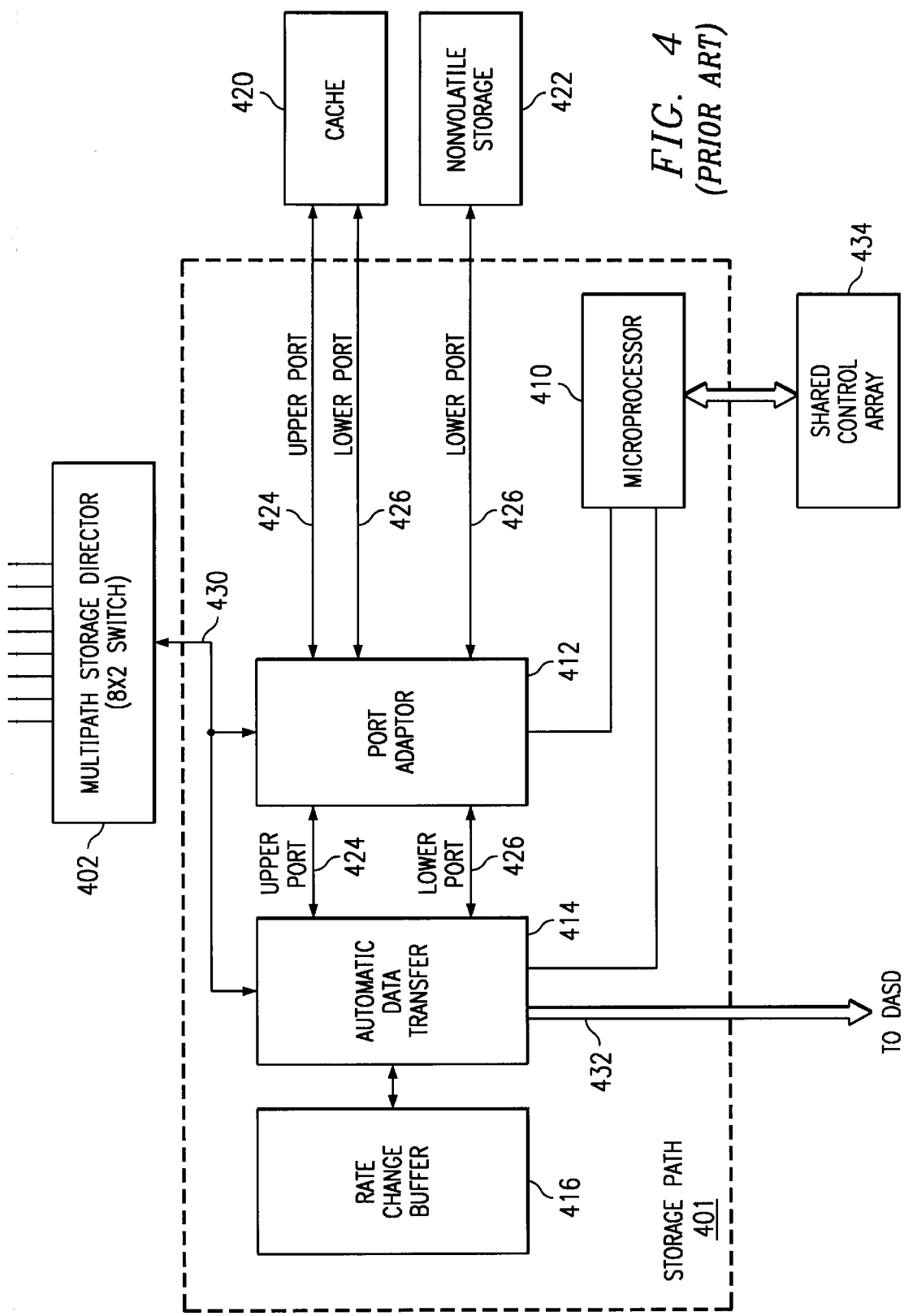
FIG. 4 is a block diagram showing a storage path in greater detail as connected in a storage controller in a data storage system.

FIG. 4 shows a storage path 401 of the storage controller in greater detail. As shown earlier in FIG. 3, the storage controller contains four storage paths, each storage path being identical to the other three. Thus, only one storage path will be described in detail. The storage path 401 is connected to an 8×2 switch 402 by an upper channel port 430 and to a plurality of DASDs by a lower device port 432. The storage path 401 contains a microprocessor 410 which controls all operations taking place within the storage path 401. The microprocessor 410 is capable of interpreting channel commands received from the host processor as well as controlling the attached DASDs. The microprocessor 410 executes microinstructions loaded into a control memory, or control store (not shown), through an external support facility.

A shared control array (SCA) 434 is also shown in FIG. 4. The SCA contains information shared by all four storage paths of the storage controller. Each microprocessor 410 in the storage path 401 accesses the SCA 434 to obtain shared information. Typical shared information includes certain external registers used by the microprocessors of all four storage paths, device status, and channel reconnection data.

The storage path 401 also contains a port adaptor (PA) 412 which provides data paths and control lines for the transfer of data between cache 420, non-volatile storage (NVS) 422, and an automatic data transfer (ADT) buffer 414, 416. The ADT buffer consists of an ADT circuit 414 and a rate change buffer 416. The rate change buffer 416 compensates for differences between the data transfer rate of the DASD and the host processor to channel connection. Typically in data processing systems, data transfer rates between a channel and a storage controller, or channel transfer rates, are much higher than data transfer rates between a DASD and a storage controller, or DASD transfer rates.

The port adaptor 412 uses an upper cache port 424 and a lower cache port 426 to provide the data paths between the cache 420, NVS 422, and ADT buffer 414, 416. These two ports allow for two simultaneous transfers involving the cache 420. For example, data can be transferred from the cache 420 to the channel using the upper cache port 424 at the same time data is transferred from the DASD to the cache 420 using the lower cache port 426. Data transfer is initialized by the microprocessor 410 and then once started is controlled by the ADT circuit 414 without microprocessor intervention until completion.

The storage path 401 directs the transfer of data records from the host processor to one of the plurality of DASDs during direct DASD operations, caching operations, or fast write operations. Direct DASD operations involve the transfer of data between the host processor and one of the plurality of DASDs without using cache or NVS for temporary storage of the data. In this case, the storage path 401 uses the ADT buffer 414, 416 to temporarily store the data for transfer to the DASD.

During caching operations, the storage path 401 stores the data in the cache memory 420 and branches the data to the DASD. In this case, the data is transferred into the ADT buffer 414, 416 using the upper channel port 430. The data is then transferred from the ADT buffer 414, 416 to the cache memory 420 using the upper cache port 424 and to the DASD using the lower device port 432. The data remains in the cache memory 420 for a time interval after it is branched to the DASD. If the host processor requests to read the data before it is updated, the storage path 401 can direct the data to be read from the cache 420 thereby increasing the performance of the data processing system.

During fast write operations, the storage path 401 initially stores the data into cache 420 and NVS 422. The data is then destaged from NVS 422 to the DASD at a later time. In this fast write case, the data is transferred into the ADT buffer 414, 416 using the upper channel port 430. The data is then transferred from the ADT buffer 414, 416 to cache 420 using the upper cache port 424 and to NVS 422 using the lower cache port 426. As with caching operations, if the host processor requests to read the data before it is updated, the storage path 401 can direct the data to be read from the cache 420 thereby increasing the performance of the data processing system.

In addition to directing the transfer of data, the storage path 401 also maintains the status of one or more duplex pairs. Control blocks are kept within the storage controller 3, 6 indicating the duplex pair status of one or more DASDs 4, 7 connected to the storage controller 3, 6. These control blocks generally reside within the shared control array 434, but may also stored within the cache 420 or the NVS 422. The storage path sets and resets flags within the control blocks to indicate when the secondary DASD 7 needs to be synchronized with the primary DASD 4. The secondary DASD 7 is synchronized with the primary DASD 4 when all record updates transferred to the primary DASD 4 have also been copied to the secondary DASD 7 through the primary and secondary storage controllers 3, 6. As mentioned previously, the record updates are temporarily stored in the cache 420 and/or the NVS 422 until an exact replica of the record updates has been successfully stored on the secondary DASD 7. The storage path 401 can also respond to a request by the host processor 1, 5 application through the storage controller 3, 6 and the port adaptor 412 to establish a duplex pair 4, 7. The storage path 401 sends the device commands through the lower port adaptor 426. Likewise, the storage path 401 can suspend or terminate a duplex pair 4, 7 when requested by the host processor 1, 5 application or when a device error is detected on either the primary 4 or secondary DASD 7. The storage path 401 again uses the lower port adapter 426 to send the device commands necessary to suspend or terminate the duplex pair. The storage path 401 then communicates to the host processor 1, 5 through the port adaptor 412 that the duplex pair has been suspended or terminated.

Figure 5:
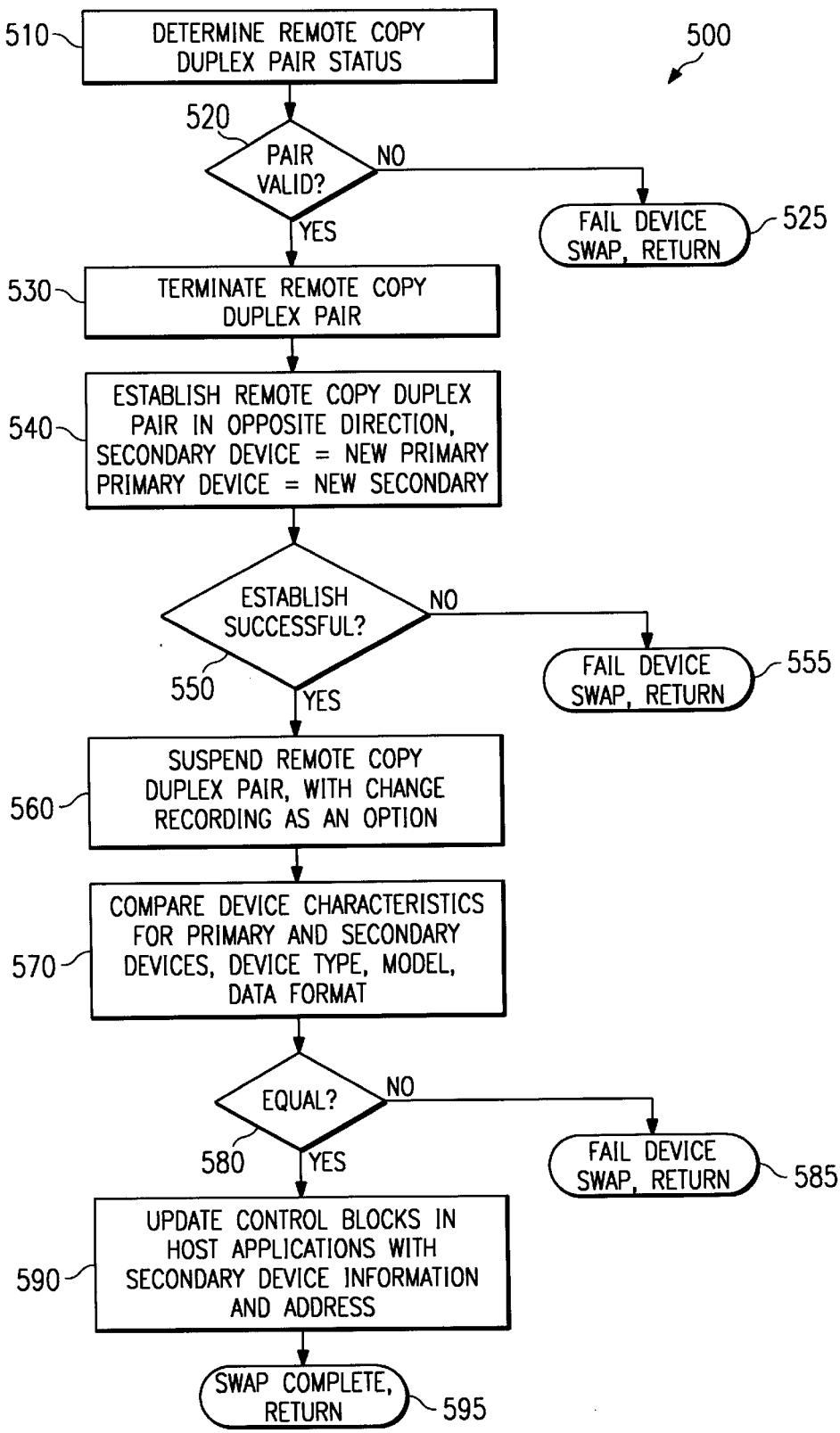
FIG. 5 is a flow diagram of a method for device swapping such that host directed I/O operations are switched from a primary data storage device of a remote copy duplex pair to a secondary data storage device of the duplex pair.

Referring to FIG. 5, a flow diagram describes a method 500 for swapping, or switching, the secondary data storage device with the primary data storage device of a remote copy duplex pair. In a disaster recovery system 10, a failure in the storage controller requires a switch be made to the shadowing DASD 7 from the primary DASD 4 to maintain continued access to the data stored within the remote copy duplex pair 4, 7. Prior to this invention, data access methods simply redirected a host processor 1 request for data from the primary DASD 4 to the secondary, or shadowing, DASD 7. This redirection of the host request required that both the primary storage controller 3 and the secondary storage controller 6 be operating without failure, since the data access path from the primary host processor 1 to the secondary DASD 7 went through both storage controllers 3, 6. To illustrate, a redirected request from the primary host processor 1 would be routed along the channel 12 to the primary storage controller 3, then across the communication links 8 to the secondary storage controller 6, and finally to the secondary DASD 7. A permanent error in the primary storage controller 3 prohibited access to the data within the remote copy duplex pair 4, 7 until the proper maintenance action could recover the error. However, a disaster recovery system 10 with the device swap feature 500 of the current invention provides a path to the data stored at the secondary DASD 7 for the primary host processor 1 without routing through the primary storage controller 3. Here, the primary host processor 1 directly accesses the secondary DASD 7 through channel 9 and secondary storage controller 6.

A step 510 determines the current status of the remote copy duplex pair 4, 7. A step 520 checks whether the primary DASD 4 and the secondary DASD currently form a valid remote copy pair. That is, all record updates transferred to the primary DASD 4 have been successfully copied to the secondary DASD 7. To maintain data integrity, a device swap 500 can only be performed on a remote copy duplex pair where the secondary DASD 7 is an exact replica of the primary DASD 4. If the remote copy duplex pair is not valid, step 525 fails the device swap operation 500 and returns control to the calling function. Otherwise, the duplex pair is valid and step 530 terminates the current remote copy duplex pair 4, 7. At step 540, an opposite direction remote copy duplex pair is established such that the secondary DASD 7 is the primary, targeted device for all subsequent primary host 1 I/O operations to the duplex pair 4, 7. Accordingly, the primary DASD 4 becomes the shadowing device for all subsequent I/O operations from the primary host processor 1 directed to the duplex pair 7, 4.

A step 550 verifies that the opposite direction remote copy duplex pair was successfully established. If not, step 555 fails the device swap operation 500 and returns control to the calling function or routine. Otherwise, step 560 optionally suspends the newly established opposite direction remote copy duplex pair 7, 4. The pair is suspended if the device swap 500 was caused by a failure in the primary storage controller 3 or the primary DASD 4. Without such a failure, the opposite direction remote copy duplex pair 7, 4 need not be suspended. If the opposite direction duplex pair 7, 4 is suspended, change recording may be set for the secondary DASD 7. With change recording set, subsequent record updates to the secondary DASD 7 are monitored within the secondary subsystem such that when the primary DASD 4 is resynchronized with the secondary DASD 7, the updated device tracks are simply copied to the primary DASD 4 instead of the entire volume.

A step 570 compares a set of device characteristics for the primary DASD 4 and the secondary DASD 7. These device characteristics typically include the device type, the device model, and the track, or data, format of the device. A step 580 checks to see if the device characteristics for the secondary DASD 7 match the device characteristics for the primary DASD 4. If they do not match, step 585 fails the device swap operation 500. In this case, the original remote copy duplex pair is re-established with the primary DASD 4 as the targeted device and the secondary DASD 7 as the shadowing device before returning control to the calling routine. Otherwise if the device characteristics match, step 590 updates the control blocks in the applications running within the primary host processor 1 to substitute the device address for the secondary DASD 7 with the primary DASD 4. Thus, subsequent I/O operations and record updates from the primary host applications will execute directly to the secondary DASD 7 instead of the primary DASD 4. A step 595 indicates the device swap 500 completed successfully and returns such successful indication to the calling function or routine.

Figure 6:
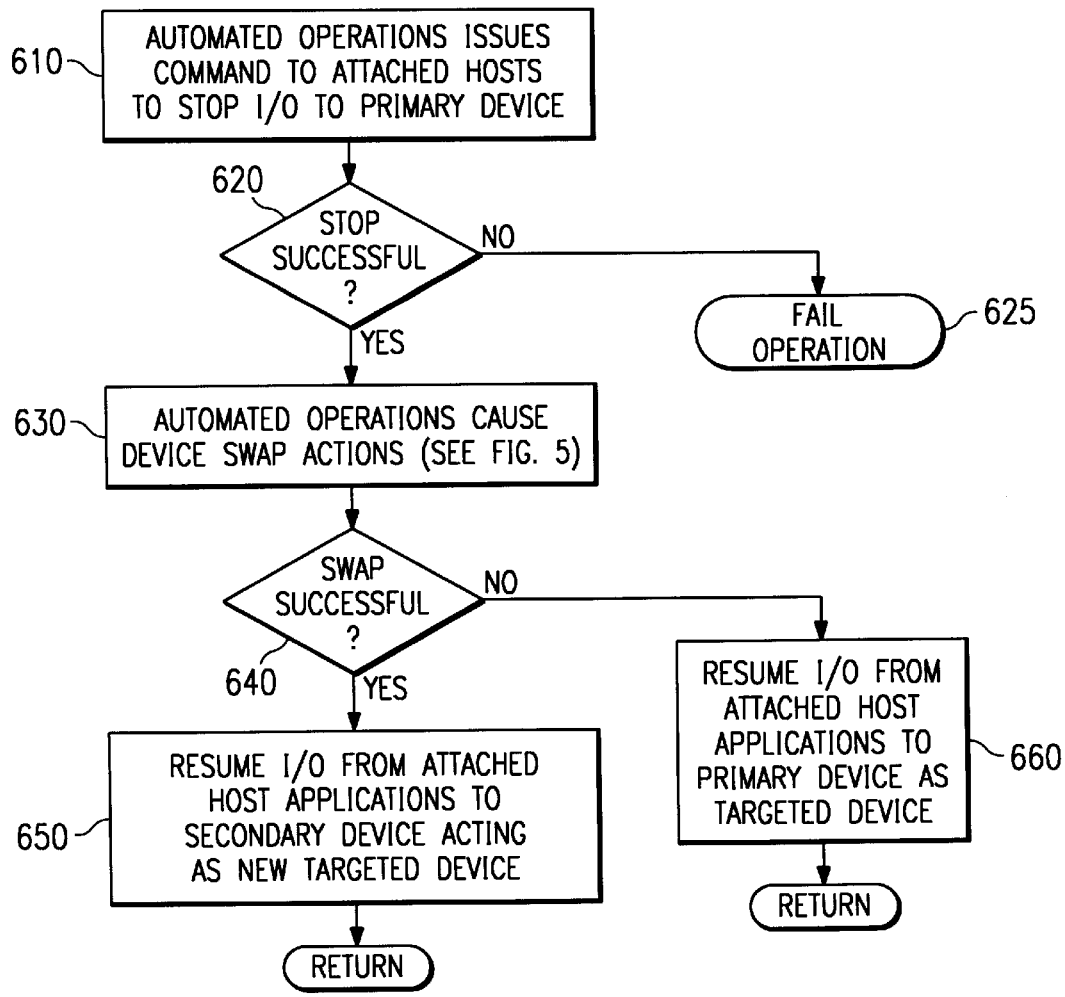
FIG. 6 is a flow diagram of a method whereby an automated operations process detects the need for and invokes the device swap outlined in FIG. 5.

Referring to FIG. 6, a flow diagram describes a procedure whereby an automated operations process within the disaster recovery system 10 would invoke the device swap feature 500 of the present invention. This may occur when the primary storage controller 3 or the primary DASD 4 has a planned maintenance action, the customer installs new DASDs and decides to migrate data from other DASDs to the newly installed DASDs, or the customer moves certain processing activity from one set of DASDs to another set in managing the workload of the entire system. At step 610, the automated operations process issues a command to the attached host processors 1 requiring them to stop, or quiesce, all I/O operations to the primary DASDs 4. At step 620, the automated operations process checks that all applications running on the attached host processors successfully quiesced all I/O operations to the primary DASD 4. If not successful, the automated operations process fails the scheduled action at step 625. Otherwise if successful, the automated operations process invokes the device swap, or switch, feature 500 at step 630.

A step 640 verifies whether the device swap 500 completed successfully. If the return code indicated that the device swap 500 failed, the automated operations process sends a command to all attached host processors 1 to resume running their applications to the primary DASD 4 as the targeted device at step 660. In this case, the secondary DASD remains the shadowing device of the remote copy duplex pair 4, 7. However, if the device swap 500 was successful, the automated operations process commands the attached host processor 1 applications to resume I/O operations to the secondary DASD 7 as the targeted device at step 650. Accordingly, the primary DASD 4 is the shadowing device of the opposite direction remote copy duplex pair 7, 4. The primary host processor 1 directly sends all subsequent I/O operations and record updates targeted for the primary device to the secondary DASD 7 through channel 9 and the secondary storage controller 6.

Figure 7:
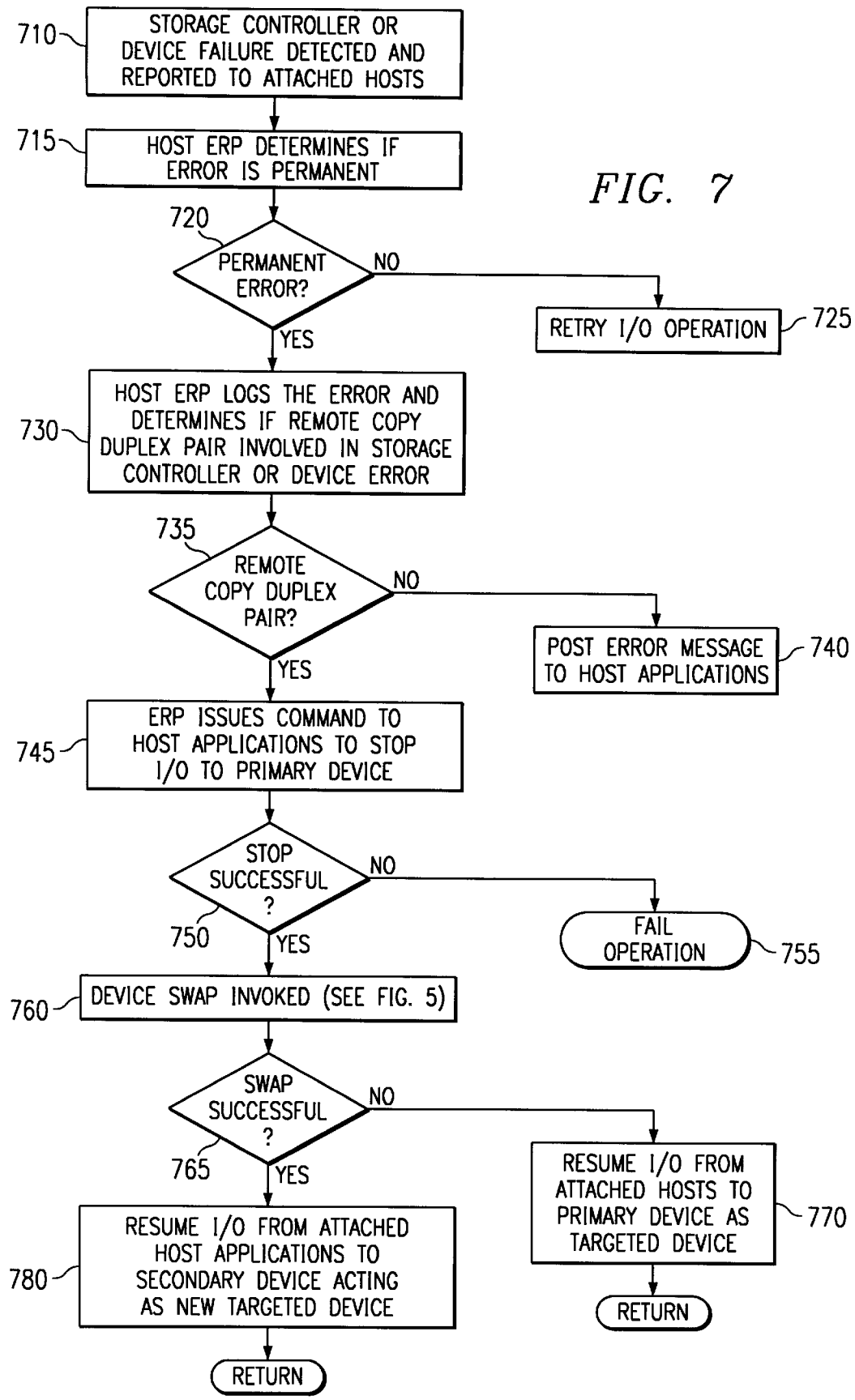
FIG. 7 is a flow diagram of a method whereby an Error Recovery Program (ERP) within the primary host processor detects the need for and invokes the device swap outlined in FIG. 5.

Referring to FIG. 7, a flow diagram describes a method whereby an Error Recovery Program (ERP) within the primary host processor 1 invokes the device swap function 500 outlined in FIG. 5. This method occurs when either a failure in the primary storage controller 3 or a permanent error on the primary DASD 4 is detected. When either of these failures occur, an error indication is raised to all attached primary host processors 1, such as a Unit Check Next Start I/O signal. A step 710 is provided for the detection of the error condition at the primary host processors 1. The ERP operating within the attached primary host processors 1 gains program control from the applications running within the primary host processor to take actions on the reported failures. The host ERP determines if the error is a permanent error at step 715, before the applications notice the error.

A step 720 checks whether the host ERP was able to recover the error. If the error is not permanent but recoverable, the host I/O operation is retried in step 725 and the applications running with the primary host processor never receive the failure. Otherwise if the error is permanent, the host ERP stores the error, or failure, code in a maintenance log to assist in future corrective actions. At step 730, the host ERP determines whether the failure is in a DASD that forms a remote copy duplex pair or a storage controller connected to one or more remote copy duplex pairs. A step 735 checks whether the permanent error relates to a remote copy duplex pair. If not, the host ERP simply reports the permanent error at step 740 to the applications running in the attached primary host processors 1. Otherwise if the permanent error relates to a remote copy duplex pair, the host ERP issues a command at step 745 to the host applications to stop, or quiesce, all I/O operations and record updates to the primary DASDs 4 effected by the permanent error.

A step 750 verifies that all the attached primary host processors successfully quiesced the I/O operations to the effected primary DASDs 4. If not, the host ERP fails the operation at step 755 and again reports the permanent failure to the attached host applications. Otherwise if the I/O operations were successfully quiesced to the effected primary DASDs 4, the host ERP invokes the device swap function 500 at step 760. A step 765 checks whether the device swap 500 completed successfully. If the device swap 500 failed, the host ERP issues a command to the attached host applications at step 770 to resume I/O operations and record updates to the primary DASD 4 as the targeted device. In this case, the secondary DASD remains the shadowing device of the remote copy duplex pair 4, 7. However, if the device swap 500 was successful, the host ERP commands the attached host applications at step 780 to resume I/O operations to the secondary DASD 7 as the targeted device. Accordingly, the primary DASD 4 is the shadowing device of the opposite direction remote copy duplex pair 7, 4. The primary host processor 1 directly sends all subsequent I/O operations and record updates targeted for the primary device to the secondary DASD 7 through channel 9 and the secondary storage controller 6.

Figure 8:
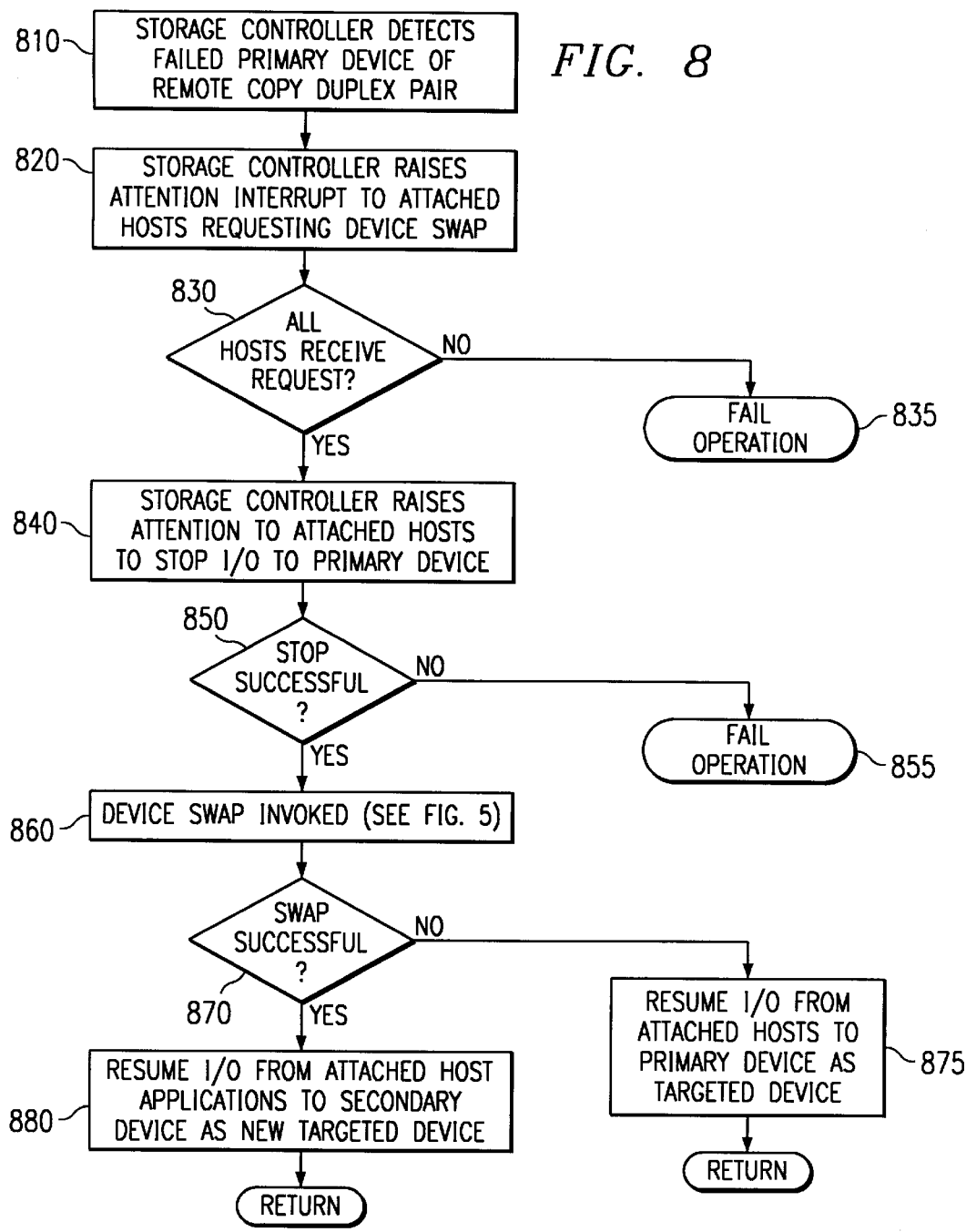
FIG. 8 is a flow diagram of a method whereby the storage controller at the primary site detects the need for and invokes the device swap outlined in FIG. 5.

Referring to FIG. 8, a flow diagram describes a method whereby the storage controller 3 at the primary site invokes the device swap function 500 outlined in FIG. 5. This method is initiated at the primary storage controller 3 and occurs under the same circumstances needed by the automated operations process referred to in FIG. 6. Additionally, the primary storage controller 3 can invoke the device swap function 500 when it detects a permanent error on the primary DASD 4. A step 810 denotes that the primary storage controller 3 detects a condition which potentially warrants the device swap function 500 such as a permanent device error on a primary DASD 4 or customer-initiated maintenance action. At step 820, the primary storage controller 3 raises an attention interrupt to the attached host processors 1 at the primary site requesting a device swap 500. Each attached host processor 1 must process this request and respond to the primary storage controller. For a device swap 500 to occur, each host processor must also allow, or grant permission to, the primary storage controller 3 to proceed with the device swap operation 500.

A step 830 verifies that the attached primary host processors 1 responded to primary storage controller 3 request allowing the storage controller 3 to proceed. If not, the primary storage controller 3 raises an attention interrupt to the attached host processors 1 at step 835 indicating that the operation failed. Otherwise if the attached host processors 1 responded favorably to the storage controller's 3 request to proceed, the primary storage controller 3 issues an attention action to the attached host processors 1 at step 840 requesting that all applications running with the hosts 1 quiesce their I/O operations to the primary DASD 4.

A step 850 checks whether the attached host applications successfully quiesced the I/O operations to the primary DASD 4. If not, the primary storage controller 3 notifies the attached host processors 1 at step 855 indicating that the operation failed. Otherwise if the host applications successfully quiesced all I/O operations to the primary DASD 4, the primary storage controller 3 invokes the device swap function 500 at step 860. In this case, the storage controller 3 manages the terminating of the previous remote copy pair and the establishing of the new opposite direction remote copy pair. The storage controller also updates its copies of the remote copy pair status contained in either the shared control array 434 or the NVS 422 and prompts the attached host processors to update their control blocks with the device address of the secondary DASD 7 as the primary, targeted device of the opposite direction remote copy pair 7, 4.

A step 870 determines whether the device swap 500 operation completed successfully. If the device swap 500 failed, the primary storage controller 3 raises an attention to the attached host processors 1 at step 875 requesting that the host applications resume I/O operations with the primary DASD 4 still the targeted device of the remote copy duplex pair 4, 7. Otherwise if the device swap 500 completed successfully, the primary storage controller raises an attention to the attached host processors 1 at step 880 requesting the host applications to resume I/O operations to the secondary DASD 7 as the targeted device of the opposite direction remote copy duplex pair 7, 4. Accordingly, the primary DASD 4 is the shadowing device of the remote copy duplex pair 7, 4. The primary host processor 1 directly sends all subsequent I/O operations and record updates targeted for the primary device to the secondary DASD 7 through channel 9 and the secondary storage controller 6.

Figure 9:
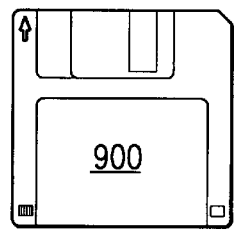
FIG. 9 is a block diagram representing a storage medium or memory for storing computer executable instructions.

FIG. 9 depicts a storage medium 900 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

While the invention has been particularly shown and described with reference to preferred embodiments thereof, it will be understood by those skilled in the art that various changes in form and details may be made therein without departing from the spirit and scope of the invention. For example, the device swap, or switch, function has been particularly described within a synchronous remote copy, or remote data duplexing, environment. The device swap function could also be used within an asynchronous remote copy, or remote data duplexing, system for disaster recovery. In addition, the storage devices are not meant to be limited to DASD devices.

What is claimed is:

1. In a data processing system providing remote data shadowing for disaster recovery purposes, said data processing system including a primary site and a secondary site, said primary site having a primary host processor running applications generating I/O operations and record updates, a primary data storage device for receiving said I/O operations and storing said record updates, and a primary storage controller coupled between said primary host processor and said primary data storage device for directing said I/O operations and said record updates to said primary data storage device, said data processing system further including a secondary site having a secondary host processor communicating with said primary host processor, a secondary data storage device for storing a copy of said record updates for data shadowing of said primary data storage device, and a secondary storage controller coupled between said secondary host processor and said secondary data storage device, said secondary storage controller further coupled to said primary host processor, a method in said primary site for switching said secondary data storage device for said primary data storage device to receive said I/O operations and said record updates from said primary host processor comprising steps of:

(a) quiescing said I/O operations and said record updates generated by said applications running in said primary host processor and to be received by said primary data storage device;

(b) verifying that said primary data storage device and said secondary data storage device are a remote copy duplex pair;

(c) terminating said remote copy duplex pair;

(d) establishing an opposite direction remote copy duplex pair such that said secondary data storage device serves as a primary device of said remote copy duplex pair and said primary data storage device serves as a shadowing device of said remote copy duplex pair;

(e) updating said applications running in said primary host processor with a device address of said secondary data storage device substituted as a device address of said primary data storage device; and (f) resuming said remote data shadowing using said opposite direction remote copy duplex pair such that subsequent record updates generated by said applications running in said primary host processor are directed through said secondary storage controller, stored in said secondary data storage device, and copied to said primary data storage device.

2. The method of claim 1 wherein the step (a) is in response to a I/O Stop command issued to said primary host processor from an automated operations process activated at said primary site.

3. The method of claim 1 wherein the step (a) is initiated by an Error Recovery Program (ERP) running in said primary host processor responding to a error signal received from said primary storage controller indicating a permanent error was detected in said primary storage controller or said primary data storage device.

4. The method of claim 1 wherein the step (a) is initiated by said primary storage controller raising an attention interrupt to said primary host processor indicating said primary storage controller has detected a permanent error on said primary data storage device.

5. The method of claim 4 further comprising:

(g) suspending said opposite direction remote copy duplex pair when said primary storage device fails due to a permanent error to allow said subsequent record updates generated by said applications running in said primary host processor to be stored in said secondary data storage device while said primary data storage device is recovering from said permanent error.

6. The method of claim 5 wherein the step (g) further comprises change recording for said secondary data storage device such that said subsequent record updates transferred to said secondary data storage device are recorded within said secondary storage controller to allow said subsequent record updates to be copied to said primary data storage device after said primary data storage device recovers from said permanent error and said opposite direction remote copy duplex pair is reestablished.

7. The method of claim 1 wherein the step (e) further comprises setting an I/O control block within said applications running in said primary host processor to indicate said secondary data storage device is said primary device of said opposite direction remote copy duplex pair.

8. The method of claim 1 further comprising steps of:

(g) determining a set of device characteristics including a device type, model, and data format for said primary data storage device and said secondary data storage device; and (h) verifying that said set of device characteristics indicates that said primary data storage device and said secondary data storage device are compatible.

9. In a data processing system providing remote data shadowing for disaster recovery purposes, said data processing system including a primary site and a secondary site, said primary site having a primary host processor running applications generating I/O operations and record updates, a primary data storage device for storing said record updates, and a primary storage controller coupled between said primary host processor and said primary data storage device, said secondary site having a secondary host processor, a secondary data storage device for shadowing copies of said record updates stored on said primary data storage device, and a secondary storage controller coupled between said secondary host processor and said secondary data storage device, said secondary storage controller further coupled to said primary storage controller and said primary host processor, said primary storage controller comprising:

a memory for storing said copies of said record updates to be subsequently transferred to said secondary site for remote data shadowing;

a storage path coupled for receiving said record updates from said primary host processor, said storage path directing said record updates to said primary data storage device, and further directing said copies of said record updates to said memory; and device swapping means coupled to said primary host processor and further coupled to said secondary storage controller for interchanging said secondary data storage device with said primary data storage device by:

issuing a first request to said primary host processor to quiesce said record updates generated by said applications running in said primary host processor;

verifying that said primary data storage device and said secondary data storage device form a remote copy duplex pair;

terminating said remote copy duplex pair;

establishing an opposite direction remote copy duplex pair such that said secondary data storage device serves as a primary device of said opposite direction remote copy duplex pair and said primary data storage device serves as a shadowing device of said opposite direction remote copy duplex pair;

substituting a device address of said secondary data storage device for a device address of said primary data storage device;

issuing a second request to said primary host processor to resume said remote data shadowing using said opposite direction remote copy duplex pair; and directing subsequent record updates generated by said applications running in said primary host processor to said secondary site, said subsequent record updates stored in said secondary data storage device and copies of said subsequent record updates shadowed to said primary data storage device.

10. The storage controller of claim 9 wherein said device swapping means further suspends said opposite direction remote copy duplex pair when said primary data storage device fails due to a permanent error and continues directing said subsequent record updates to said secondary data storage device while said primary data storage device recovers from said permanent error.

11. The storage controller of claim 10 wherein said device swapping means enables change recording such that said subsequent record updates stored in said secondary data storage device are recorded within said secondary storage controller, thereby allowing said subsequent record updates to be copied to said primary data storage device after said primary data storage device recovers from said permanent error and said opposite direction remote copy duplex pair is reestablished.

12. The storage controller of claim 9 wherein said device swapping means further includes setting a duplex pair status control block within said memory to indicate whether said opposite direction remote copy duplex pair is established, suspended, or terminated.

13. The storage controller of claim 9 wherein said device swapping means sends a third request to said primary host processor to set an I/O control block to indicate to said applications that said secondary data storage device is said primary device of said opposite direction remote copy duplex pair.

14. The storage controller of claim 9 wherein said memory is a cache memory.

15. The storage controller of claim 9 wherein said memory is a non-volatile storage.

16. A remote data duplexing system providing disaster recovery capabilities, said remote data duplexing system having a primary site and a secondary site, said secondary site receiving record updates from said primary site for data shadowing, said secondary site located remote from said primary site, said remote data duplexing system comprising:

a primary host processor at said primary site running a plurality of applications, said plurality of applications generating I/O operations and said record updates;

a primary data storage device at said primary site for receiving said I/O operations and storing said record updates;

a primary storage controller coupled between said primary host processor and said primary data storage device for directing said I/O operations and said record updates from said primary host processor to said primary data storage device;

a secondary host processor at said secondary site coupled to said primary host processor by a data link;

a secondary data storage device at said secondary site for shadowing said record updates stored on said primary data storage device, said secondary data storage device forming a remote copy duplex pair with said primary data storage device;

a secondary storage controller coupled between said secondary host processor and said secondary data storage device, said secondary storage controller further coupled to said primary storage controller and said primary host processor via a plurality of fiber optic links, said secondary storage controller directing copies of said record updates stored on said primary data storage device to said secondary data storage device for data shadowing; and device swapping means in said primary processor and coupled to said primary storage controller and said secondary storage controller for interchanging said secondary data storage device with said primary data storage device, said secondary storage device serving as a primary device in said remote copy duplex pair and said primary storage device serving as a shadowing device in said remote copy duplex pair, said device switching means:

quiescing said I/O operations and said record updates generated by said applications running in said host processor and to be received by said primary data storage device;

terminating said remote copy duplex pair;

establishing an opposite direction remote copy duplex pair such that said secondary data storage device serves as a primary device of said opposite direction remote copy duplex pair and said primary data storage device serves as a shadowing device of said opposite direction remote copy duplex pair;

updating said applications running in said primary host processor with a device address of said secondary data storage device substituted as a device address of said primary data storage device; and resuming said remote data duplexing using said opposite direction remote copy duplex pair such that subsequent record updates generated by said applications running in said primary host processor are directed through said secondary storage controller, stored in said secondary data storage device, and copied to said primary data storage device.

17. The remote data duplexing system of claim 16 wherein said device swapping means suspends said opposite direction remote copy duplex pair when said primary data storage device fails due to a permanent error to allow subsequent record updates generated by said applications running in said primary host processor to be stored in said secondary data storage device while said primary data storage device is recovering from said permanent error.

18. The remote data duplexing system of claim 17 wherein said device swapping means enables change recording such that said subsequent record updates stored in said secondary data storage device are recorded within said secondary storage controller, thereby allowing said subsequent record updates to be copied to said primary data storage device after said primary data storage device recovers from said permanent error and said opposite direction remote copy duplex pair is reestablished.

19. The remote data duplexing system of claim 16 wherein said device swapping means determines a set of device characteristics including a device type, model, and data format for said primary data storage device and said secondary data storage device, said device swapping means further verifying that said set of device characteristics indicate that said primary data storage device and said secondary data storage device are compatible.

20. In a data processing system providing remote data shadowing for disaster recovery purposes, said data processing system including a primary site and a secondary site, said primary site having a primary host processor running applications generating I/O operations and record updates, a primary data storage device for receiving said I/O operations and storing said record updates, and a primary storage controller coupled between said primary host processor and said primary data storage device for directing said I/O operations and said record updates to said primary data storage device, said data processing system further including a secondary site having a secondary host processor communicating with said primary host processor, a secondary data storage device for storing a copy of said record updates for data shadowing of said primary data storage device, and a secondary storage controller coupled between said secondary host processor and said secondary data storage device, said secondary storage controller further coupled to said primary host processor and said primary storage controller, an article of manufacture for swapping said secondary data storage device for said primary data storage device to receive said I/O operations and said record updates from said primary host processors, said article of manufacture comprising a computer-readable storage medium tangibly embodying a program of executable computer instructions which may cause said data processing system to:

quiesce said I/O operations and said record updates generated by said applications running in said primary host processor and to be received by said primary data storage device;

verify that said primary data storage device and said secondary data storage device form a remote copy duplex pair;

terminate said remote copy duplex pair;

establish an opposite direction remote copy duplex pair such that said secondary data storage device serves as a primary device of said opposite direction remote copy duplex pair and said primary data storage device serves as a shadowing device of said opposite direction remote copy duplex pair;

update said applications running in said primary host processor with a device address of said secondary data storage device substituted as a device address of said primary data storage device; and resume said remote data shadowing using said opposite direction remote copy duplex pair such that subsequent record updates targeted for said primary data storage device are directed through said secondary storage controller, stored in said secondary data storage device, and copied to said primary data storage device.

* * * * *